United States Patent [19]

Meyer

[11] 4,319,910

[45] Mar. 16, 1982

[54] GELATED MICRONUTRIENT FERTILIZERS, PROCESS FOR THEIR MANUFACTURE AND THEIR USE FOR PLANT FERTILIZATION

[75] Inventor: Klaus Meyer, Kelkheim, Fed. Rep. of Germany

[73] Assignee: Hoechst Aktiengesellschaft, Frankfurt am Main, Fed. Rep. of Germany

[21] Appl. No.: 87,943

[22] Filed: Oct. 25, 1979

[30] Foreign Application Priority Data

Oct. 27, 1978 [DE] Fed. Rep. of Germany ....... 2846832

[51] Int. Cl.³ .......................... C05C 1/02; C05C 3/00
[52] U.S. Cl. .......................................... 71/27; 71/57; 71/64 C
[58] Field of Search ............... 71/27, 31, 54, 61, 64 R, 71/64 A, 64 C, DIG. 2, 124, 57

[56] References Cited

U.S. PATENT DOCUMENTS 3,898,070  8/1975  Dazzi ............................. 71/DIG. 2
4,055,974  11/1977  Jackson, Jr. ........................ 71/64 A
4,125,393  11/1978  Kohl ..................................... 71/27

FOREIGN PATENT DOCUMENTS 1505351  3/1978  United Kingdom ........... 71/DIG. 2

Primary Examiner—Michael S. Marcus
Attorney, Agent, or Firm—Curtis, Morris & Safford

[57] ABSTRACT

Water-soluble gelated micronutrient fertilizers containing 55 to 89% by weight of water soluble compounds of micronutrients of which 25 to 100 mol % of the cations are present in complexed form, 2 to 7% by weight of ammonium nitrogen as macronutrient, 2 to 18% by weight of polyglycol ether having at least 9 ethylene oxide (EO) units and/or water-soluble polyglycol ether derivatives having at least 8 EO units in the molecule and 7 to 20% by weight of water, process for their manufacture and their use for plant fertilization.

7 Claims, No Drawings

GELATED MICRONUTRIENT FERTILIZERS, PROCESS FOR THEIR MANUFACTURE AND THEIR USE FOR PLANT FERTILIZATION

This invention relates to water-soluble gelated micronutrient fertilizers, to a process for their manufacture and to their use for plant fertilization.

Up to now, water-soluble micronutrient fertilizers have become known only in solid (cf. DE-PS No. 2,313,921) or in liquid (cf. DE-OS No. 2,434,875) form. The stability of liquid micronutrient fertilizers is mostly unsatisfactory. During storage dissolved constituents thereof may precipitate in water-insoluble form and, therefore cannot act directly as fertilizer.

In the known products the cations of the micronutrients are often in complexed or partially complexed form. For making solid products, mixtures of water-soluble micronutrient salts and water-soluble complex formers can also be used so that the micronutrient cations are complexed upon dissolution of the solid mixtures in water. Known complexforming agents are, for example, alkali metal salts of N-carboxyalkyl-amino acids which may form water-soluble chelate compounds with micronutrient cations. It is generally known that the micronutrients have to be water-soluble so that the plants can absorb them and they can develop their biological action.

Hence, micronutrient fertilizers are generally applied in the form of dilute aqueous solutions prepared, for example by dissolving solid and soluble micronutrient compounds in water or by diluting liquid fertilizer concentrates with water.

It takes some time until solid micronutrient fertilizers have completely dissolved in water. Moreover, they can cake together during storage and come out of solution during transport. Liquid concentrates have a relatively low nutrient content, their stability is not always satisfactory and for storage and transport they require liquid-proof and corrosion-resistant containers. Moreover, the possible dosages of solid as well as of liquid fertilizers is not satisfactory.

It is, therefore, the object of the present invention to provide water-soluble gelated micronutrient fertilizers containing from 55 to 89% by weight, preferably 67 to 77% by weight, of water-soluble micronutrient compounds, preferably of magnesium, iron, zinc, maganese, copper, cobalt, nickel, boron, and molybdenum, of which 25 to 100 mol %, preferably 40 to 70 mol % are present in complexed form, preferably in the form of a chelate complex with N-carboxy-alkyl-amino acids, from 2 to 7% by weight, preferably 3 to 6% by weight of ammonium nitrogen as macronutrient, from 2 to 18% by weight, preferably 4 to 12% by weight, of a polyglycol ether having at least 9 ethylene oxide (EO) units in the molecule and preferably an average molecular weight of 400 to 10,000, more preferably 600 to 6,000 and/or a water-soluble polyglycol ether derivative having at least 8 ethylene oxide units in the molecule, preferably 9 to 230 and more preferably 11 to 60 EO units, and from 7 to 20% by weight of water.

The term ethylene oxide units (EO) is intended to indicate the number of ethylene oxide units per molecule of polyglycol ether or polyglycol ether derivative, which are addition products of ethylene oxide (cf. for example, Kurt Lindner, Tenside-Textilhilfsmittel-Waschrohstoffe, Wiss. Verlagsgesellschaft Stuttgart (1964), volume 1, pages 183 and 865 et seq.).

It is another object of the present invention to provide a process for the manufacture of the foregoing water-soluble gelated micronutrient fertilizers, which comprises neutralizing with $NH_3$ gas while stirring a mixture consisting of 55 to 89 parts by weight, preferably 67 to 77 parts by weight, of water-soluble micronutrient salts, preferably of Mg, Fe, Zn, Mn, Cu, Co, Ni, preferably as sulfates, chlorides and nitrates, B preferably in the form of boric acid and/or boric anhydride, Mo, preferably in the form of ammonium molybdate, including 25 to 100 mol %, preferably 40 to 70 mol %, calculated on the micronutrient cations, of complex forming agents in the acid form, preferably compounds forming chelate complexes, especially N-carboxy-alkyl-amino acids, from 7 to 20 parts by weight of water and 2 to 18 parts by weight, preferably 4 to 12 parts by weight of a polyglycol ether having at least 9 ethylene oxide units in the molecule and preferably an average molecular weight of 400 to 10,000, especially 600 to 6,000 and/or a polyglycol ether derivative having at least 8 ethylene oxide units, preferably 9 to 230 and more preferably 11 to 60 EO units, solid polyglycol ethers or polyglycol ether derivatives possibly being previously dissolved in the water portion of the fertilizer, until the mixture has acquired a pH of from 3 to 6, preferably 5, and cooling to room temperature (about 20° to 25° C.) while stirring the homogeneous mixture obtained and heated to 35° to 100° C., preferably 45° to 70° C., by the heat of neutralization and additional heat, if necessary.

According th one embodiment of the process of the invention the complex forming agent is added not in its acid form but partly or completely in the form of its ammonium salt so that the neutralization with ammonia can be partially or wholly dispensed with. In this case less or no heat of neutralization is available.

The other constituents of the fertilizer are then mixed, for example, with the ammonium salt or the partial ammonium salt of the complex forming agent, while stirring and heating to 35° to 100° C., preferably 45° to 70° C., the pH is adjusted, if necessary, and the homogeneous mixture is cooled to room temperature while stirring.

Stirring and thorough mixing of the batch during cooling is necessary in order to prevent the nutrient components from coming out of solution.

The gelated micronutrient fertilizers are obtained by the process of the invention in fully homogeneous form. When packed in tubes, for example, they can be readily dosed by sqeezing. When the fertilizers are stored in closed containers for several weeks at room temperature or at 40° C. or in the cold test no separation can be observed. The density of the pastes varies with the type and amount of the components, it is preferably in the range of from 1.4 to 1.5 kg/l. The pH in the claimed range of 3 to 6 is not critical. A higher or lower pH may cause trouble in some cases. A higher pH may disturb, for example, the complex formation and thus impair the water-solubility of the micronutrient compounds. Pastes that are too acid may cause phytotoxic damages, for example on a direct contact of an aqueous solution thereof with parts of the plants.

The gelated micronutrient fertilizers according to the invention are very rapidly and readily soluble in water. In general, they form clear solutions, especially with concentrations of up to about 10% by weight. For identification the pastes can be colored with known dyes. If the pastes contain surface-active polyglycol ether derivatives which may tend to foam in aqueous solution, the usual defoaming agents, for example silicones, may be added.

As polyglycol ethers, which are obtained, for example, by reacting ethylene oxide with glycol or lower glycol ethers, or as water-soluble polyglycol ether derivatives, the following products, named by way of example, can be used: polyglycol ethers (commercialized mostly as polyglycols), preferably those having an average molecular weight of from 400 to 10,000, more preferably 600 to 6,000. Low molecular weight compounds of this type within the indicated range are liquid, while those with higher molecular weight are solids having a wax-like consistency. The specified polyglycol ethers are especially preferred. Suitable water-soluble polyglycol ether derivatives having at least 8 EO units in the molecule are those in which preferably one or both terminal hydroxy groups are substituted, preferably etherified, esterified or substituted by amino, imino or acid amide groups, and which may be surface-active. Especially preferred compounds are alkyl-polyglycol ethers and alkylphenyl-polyglycol ethers obtained by addition of ethylene oxide on linear or branched, monohydric or polyhydric, saturated or unsaturated alcohols or on alkylphenols. Acylpolyglycol ethers can also be used. There are mentioned by way of example methylpolyglycol ethers, ethylpolyglycol ethers, butylpolyglycol ethers, octylpolyglycol ethers, laurylpolyglycol ethers, isotridecylpolylycol ethers, hexadecylpolyglycol ethers, octadecylpolyglycol ethers, preferably those having up to 60 EO units, for example (n-$C_{18}$)alkylpolyglycol ethers having 50 EO units, 25 EO units or 11 EO units, ($C_{12}$–$C_{15}$)-alkylpolyglycol ethers having 25 EO units, addition products of ethylene oxide on glycerol, glycerol esters or sorbitans, nonyl-phenyl-polyglycol ether having 30 EO units, 23 EO units or 15 EO units, tributylphenylpolyglycol ethers having 50 EO units or 18 EO units, esters of polyglycol ethers with organic or inorganic acids or acid derivatives, for example lower or higher carboxylic acids such as acetic acid, propionic acid, lauric acid, ($C_8$–$C_{24}$)-carboxylic acids, fatty acids, for example ($C_{12}$–$C_{15}$)fatty-acylpolyglycol esters having 25 EO units as well as esters with phosphoric acid, phosphonic acids and the derivatives thereof.

There are also preferred water-soluble block-copolymeric polyether glycols (BcPG) as obtained, for example, by the addition of ethylene oxide (EO) to a condensation product of propylene oxide (PyO) with propylene glycol, such as BcPG 20 (20% by weight of EO and 80% by weight of PyO; liquid)

BcPG 40 (40% by weight of EO and 60% by weight of PyO; liquid)

BcPG 80 (80% by weight of EO and 20% by weight of PyO; solid, molecular weight from 6,600 to 9,300).

Mixtures of various polyglycol ethers and/or various water-soluble polyglycol ether derivatives can also be used.

Suitable-water-soluble compounds of micronutrients are all known water-soluble and non-phytotoxic inorganic and organic compounds of the known micronutrients required besides the known macronutrients such as N, P and K, for the synthesis of enzyme systems of the vegetable cell to ensure a normal growth of the plants.

For the manufacture of the gelated micronutrient fertilizers according to the invention water-soluble micronutrient salts are used, preferably the chlorides, sulfates, nitrates, and optionally also the acetates, especially of Mg, Fe, Zn, Mn, Cu, Co, Ni, molybdenum preferably in the form of water-soluble molybdates, for example ammonium molybdate, and boron preferably in the form of boric acid and/or boric anhydride. It is likewise possible, of course, to use other water-soluble salts of the aforesaid micronutrients. Water-soluble calcium salts can also be used. The micronutrient compounds can be combined with one another as desired and the combination can be adapted to the requirements in each case. The pastes can be prepared with one micronutrient as well as with a combination of any two or more of the aforesaid micronutrient compounds.

To ensure that the aforesaid salts are soluble in water some of them have to be stabilized, for example by suitable complex-forming agents. Commercialized concentrates of liquid or solid micronutrients generally contain the salts in combination with the appropriate complex forming agents.

In the manufacture of the gelated micronutrient fertilizers according to the invention known complex-forming agents for micronutrient cations which form water-soluble and hydrolysis-resistant complex compounds with the said cations can be used for complexing. In addition to acid groups capable of salt formation, these complex-forming agents generally contain further groupings in the molecule which may additionally bind by side valence forces the cations bound to the acid groups so that water-soluble and hydrolysis-resistant complex compounds are obtained, especially with metal cations and, above all, with cations of the transition elements used as micronutrients.

Suitable complex forming agents are, for example, derivatives of aspartic acid, substituted amino-polycarboxylic acids, such as N-(2-hydroxybenzyl)-substituted aminopolycarboxylic acids, phosphonocarboxylic acids, for example 2-phosphobutane-1,2,4-tricarboxylic acid, phosphonic acids such as 1,2-diaminocyclohexane-tetrakis-(methylene-phosphonic acid), ligno-sulfonic acids and sulfonated tannins, gluconic acid and glucoheptonic acid.

Preferred complex-forming agents are, for example, N-carboxy-alkyl-amino acids which may be substituted or not. They form with micronutrient cations chelate complex compounds having very favorable properties.

Especially preferred N-carboxyalkyl-amino acids are, for example, ethylenediaminotetraacetic acid (EDTA) and nitrilo-triacetic acid (NTA).

Other preferred compounds are diethylenetriaminopentaacetic acid (DPTA), hydroxyethyl-ethylenediaminotriacetic acid (HEEDTA) and cyclohexane-1,2-diaminotetraacetic acid (CDTA).

In general, the aforesaid complex-forming agents are used individually but, if desired, they can also be used in the form of a combination of any two or more.

In their acid form the aforesaid complex-forming agents are mostly insufficiently soluble or even insoluble in water and, therefore, they are often used in aqueous systems for example as water-soluble alkali metal salts which readily form the desired complex compounds with the said micronutrient cations.

According to an essentially preferred feature of the present invention, the aforesaid complex-forming agents are reacted in the form of their ammonium salts with the micronutrient cations. In the manufacture of the gelated micronutrient fertilizers according to the invention the ammonium salts are produced from the acid form of the complex-forming agents and simultaneously or subsequently reacted with the micronutrient cations in some type of a single pot process by neutralization with gaseous ammonia. The use of the ammonium salts of the complex-forming agents, instead of the sodium salts, mostly used up to now for complexing purposes, offers a plurality of advantages. NH3 has a considerably lower equivalent weight than sodium and, therefore, the gelated fertilizer may contain a higher percentage of micronutrients. The ammonium nitrogen in the paste resulting from the neutralization with ammonia provides additional nitrogen fertilizer content so that the content of an important macronutrient in the fertilizer is increased, which has been impossible in the known complexing of micronutrient cations with the sodium salt of the complex-forming agents in which sodium salts are formed as a useless ballast. Moreover, the complex-forming agents can be used in the form of moist filter cakes, as obtained in the production, so that a drying thereof can be dispensed with. A partial or complete neutralization of the acid form of the complex-forming agents with ammonia in a separate process is also possible and may even be advantageous in some cases.

The nitrogen content of the gelated micronutrient fertilizers resulting from the neutralization with ammonia of the acid form of the complex-forming agents is, for example in the range of from 2 to 7 and preferably 3 to 6% by weight.

A further special advantage of the process of the invention resides in the face that not only the complex-forming agents but also micronutrient salts need not be used in dry form but may advantageously be used in the form of moist filter cakes. In this case the amount of water contained in the filter cake has to be taken into consideration in the water balance of the process product. This is also valid for a possible water content in the polyglycol ethers or their derivatives.

In the gelated micronutrient fertilizers according to the invention 25 to 100 mol %, preferably 40 to 70 mol %, of the micronutrient cations are in complex form. It has been found that aqueous solutions of gelated fertilizers in the mean and upper complexing range have a higher stability than those in the lower range.

As the gelated fertilizers according to the invention dissolve almost immediately in water, additional operations necessary in the case of corresponding solid micronutrients, such as making into a paste, preparation of a master solution, warming of the water of dissolution, can be dispensed with completely. Moreover, the troublesome dusting of pulverulent fertilizers is eliminated by the pastes. In addition, the nutrient content of the gelated fertilizers is distinctly higher than that of the same volume of known liquid micronutrient fertilizers and even of corresponding solid micronutrient fertilizers, which is due, inter alia, to the low molecular weight of the ammonium salts as compared with the corresponding Na and K salts in the known micronutrient fertilizers. Dosing and handling of the fertilizer pastes, contained, for example, in tubes, is much easier than that of comparable known fertilizer formulations. Another advantage is that the pastes do not escape as may be the case with liquid fertilizers from leaky containers. The high unit weight of about 1.4 to 1.5 kg/l of the pastes according to the invention, which is much higher than the density of solid fertilizers or the specific gravity of liquid fertilizers, results in a considerable economy of storage, packing and transportation volume.

The proportion of the individual plant nutrients in the gelated fertilizers according to the invention is not critical and can be adapted to the usual and known requirements. The pastes may contain a sole nutrient or any combination of any two or more of the specified nutrients. As a result of the neutralization with NH3 of the complex-forming agents they contain a greater or lesser proportion of ammonium nitrogen as macronutrient.

The gelated micronutrient fertilizers according to the invention have an excellent fertilizing effect. For application they are dissolved in water and applied onto the plants, culture soils or media or optionally they are mixed with the culture soil or medium in the form of an aqueous solution. They can also be combined with conventional macronutrient fertilizers. The applied concentrations are not critical and can be adapted to the practical requirements in each case, for example the types of plants and the soil properties. Solutions containing from 0.05 to 5% by weight of paste proved to be especially advantageous although lower or higher concentrations appear to be possible and may be expedient in some cases.

On the whole, the novel gelated micronutrient fertilizers according to the invention represent a considerable technical progress. Their properties are extremely surprising and are not suggested by the state of the art.

The following examples illustrate the invention.

EXAMPLE 1

Gelated fertilizer containing several micronutrients

| Constituents of formulation | nutrient content of paste |
| --- | --- |
| 30.81% b.w. of $MgSO_4 \times 7 H_2O$ | 5.0% b.w. of MgO |
| 6.08% b.w. of $MnSO_4 \times 4 H_2O$ | 1.5% b.w. of Mn |
| 7.47% b.w. of $FeSO_4 \times 7 H_2O$ | 1.5% b.w. of Fe |
| 6.60% b.w. of $ZnSO_4 \times 7 H_2O$ | 1.5% b.w. of Zn |
| 1.96% b.w. of $CuSO_4 \times 5 H_2O$ | 0.5% b.w. of Cu |
| 1.72% b.w. of $H_3BO_3$ | 0.3% b.w. of B |
| 0.02% b.w. of $(NH_4)_6Mo_7O_{24} \times 4 H_2O$ | 0.01% b.w. of Mo |
| 18.00% b.w. of ethylene diaminetetraacetic acid (EDTA) | |
| 18.00% b.w. of water | |
| 4.75% b.w. of polyglycol 6000, prilled | |
| balance to 100% b.w. of ammonia | 3.7% b.w. of N |

PREPARATION OF THE PASTE (1 kg batch)

The above constituents with the exception of ammonia are charged in the indicated amounts to a heatable and sealable 2 liter vessel provided with stirrer scraping along the wall. While stirring, gaseous ammonia is introduced until the pH of the mixture is 3.0, measured with a glass electrode. Due to the heat of neutralization set free the temperature of the batch rises to about 45° C. If necessary, the mixture must be brought to this temperature by additional heating. A homogeneous phase is obtained which is then cooled to room temperature (about 20° C.) by continuously stirring. The homogeneous phase obtained has a creamy-paste and supple consistency. It does not separate even when stored for several weeks at room temperature, at +40° C. and at −10° C. The paste is well soluble in water and forms clear solutions. The degree of complexing of the micronutrient cations contained in the gelated fertilizer is found to be 29.4 mol %.

EXAMPLE 2

Gelated fertilizer containing several micronutrients

| Constituents of formulation | nutrient content of paste |
|---|---|
| 30.81% b.w. of $MgSO_4 \times 7\ H_2O$ | 5.0% b.w. of MgO |
| 7.30% b.w. of $MnSO_4 \times 4\ H_2O$ | 1.8% b.w. of Mn |
| 8.96% b.w. of $FeSO_4 \times 7\ H_2O$ | 1.8% b.w. of Fe |
| 4.40% b.w. of $ZnSO_4 \times 7\ H_2O$ | 1.0% b.w. of Zn |
| 1.96% b.w. of $CuSO_4 \times 5\ H_2O$ | 0.5% b.w. of Cu |
| 1.19% b.w. of $H_3BO_3$ | 0.2% b.w. of B |
| 0.02% b.w. of $(NH_4)_6Mo_7O_{24} \times 4\ H_2O$ | 0.01% b.w. of Mo |
| 0.005% b.w. of $CoSO_4 \times 7\ H_2O$ | 0.001% b.w. of Co |
| 0.005% b.w. of $NiSO_4 \times 7\ H_2O$ | 0.001% b.w. of Ni |
| 18.30% b.w. of nitrilotriacetic acid (NTA) | |
| 18.45% b.w. of water | |
| 4.00% b.w. of polyglycol 6000, prilled | |
| 4.6% b.w. of ammonia | 3.7% b.w. of N |

The paste is prepared as described in Example 1 with the exception that the pH is adjusted to 3.2. Consistency, stability and solubility of the paste are equal to those of Example 1. 45 Mol % of the micronutrient cations are in complex form.

EXAMPLE 3

Gelated fertilizer containing several micronutrients

| Constituents of formulation | nutrient content of paste |
|---|---|
| 24.65% b.w. of $MgSO_4 \times 7\ H_2O$ | 4.0% b.w. of MgO |
| 6.08% b.w. of $MnSO_4 \times 4\ H_2O$ | 1.5% b.w. of Mn |
| 7.47% b.w. of $FeSO_4 \times 7\ H_2O$ | 1.5% b.w. of Fe |
| 6.60% b.w. of $ZnSO_4 \times 7\ H_2O$ | 1.5% b.w. of Zn |
| 1.96% b.w. of $CuSO_4 \times 5\ H_2O$ | 0.5% b.w. of Cu |
| 1.7% b.w. of $H_3BO_3$ | 0.3% b.w. of B |
| 0.02% b.w. of $(NH_4)_6Mo_7O_{24} \times 4\ H_2O$ | 0.01% b.w. of Mo |
| 25.60% b.w. of EDTA | |
| 13.73% b.w. of water | |
| 5.75% b.w. of polyglycol 6000, prilled | |
| 6.42% b.w. of ammonia | 5.2% b.w. of N |

The paste is prepared as described in Example 1 with the exception that the pH is adjusted to 5.2 and the temperature of the batch is brought to 50° C. 47 mol % of the micronutrient cations contained in the paste are in complexed form. The paste has a density of 1.47 kg/l at 20° C.

EXAMPLE 4

Gelated fertilizer with iron as micronutrient

| Constituents of formulation | nutrient content of paste |
|---|---|
| 31.7% b.w. of $FeSO_4 \times 7\ H_2O$ | 6.3% b.w. of Fe |
| 35.6% b.w. of EDTA | |
| 14.1% b.w. of water | |
| 10.6% b.w. of polyglycol 6000, prilled | |
| 8.0% b.w. of ammonia | 6.6% b.w. of N |

The paste is prepared as described in Example 1 with the exception that the pH is adjusted to 6.0 and the mixture is brought to 65° C. The gelated fertilizer obtained has the same consistency, stability and solubility as the paste of Example 1. 100 Mol % of the iron cations are in complex form.

EXAMPLE 5

Gelated fertilizer with zinc nutrient

| Constituents of formulation | nutrient content of paste |
|---|---|
| 48.5% b.w. of $ZnSO_4 \times 7\ H_2O$ | 11.0% b.w. of Zn |
| 26.8% b.w. of EDTA | |
| 8.9% b.w. of water | |
| 10.2% b.w. of polyglycol 6000, prilled | |
| 5.6% b.w. of ammonia | 4.6% b.w. of N |

The paste is prepared as described in Example 1 but the pH is adjusted to 5.3 and the temperature to 50° C. Consistency, stability and solubility are the same as those of the paste of Example 1. 54.3 Mol % of the zinc cations are in complex form.

EXAMPLES 6 to 14

Gelated fertilizer containing several micronutrients

Fertilizer pastes are prepared as described in Example 3 with the exception that the prilled polyglycol 6000 (5.75% by weight) is replaced by the same amount (5.75% by weight) of the following polyglycol ethers or polyglycol ether derivatives and that the batches are heated to 68° to 70° C. The pH, the nutrient content and the degree of complexing of the micronutrient cations correspond to those of Example 3.

| Example No. | polyglycol ether |
|---|---|
| 6 | polyglycol 400 |
| 7 | polyglycol 600 |
| 8 | polyglycol 1000 |
| 9 | polyglycol 4000 |
| 10 | polyglycol 8000 |
| 11 | polyglycol 10000 |
| 12 | n-$C_{18}$—alkylpolyglycol ether (50 EO) |
| 13 | nonylphenylpolyglycol ether (30 EO) |
| 14 | tributylphenylpolyglycol ether (50 EO) |

The gelated fertilizers have the same consistency, stability and solubility as the pastes of Example 1. Only the fertilizers of Example 6 and 7 slightly separated after the prolonged storing time and, therefore, have a poor stability to storage. On the contrary, gelated fertilizers of Examples 8 to 14 have an excellent storing stability.

EXAMPLE 15

Gelated fertilizer containing several micronutrients

| Constituents of formulation | nutrient content of paste |
|---|---|
| 24.65% b.w. of $MgSO_4 \times 7\ H_2O$ | 4.0% b.w. of MgO |
| 6.08% b.w. of $MnSO_4 \times 4\ H_2O$ | 1.5% b.w. of Mn |
| 7.47% b.w. of $FeSO_4 \times 7\ H_2O$ | 1.5% b.w. of Fe |
| 6.60% b.w. of $ZnSO_4 \times 7\ H_2O$ | 1.5% b.w. of Zn |
| 1.96% b.w. of $CuSO_4 \times 5\ H_2O$ | 0.5% b.w. of Cu |
| 1.72% b.w. of $H_3BO_3$ | 0.3% b.w. of B |
| 0.02% b.w. of $(NH_4)_6Mo_7O_{24} \times 4\ H_2O$ | 0.01% b.w. of Mo |
| 21.70% b.w. of EDTA | |
| 7.21% b.w. of water | |
| 17.00% b.w. of BcPg 20 | |
| 5.59% b.w. of ammonia | 4.6% b.w. of N |

The paste is prepared under the conditions of Example 1 with the exception that the pH is adjusted to 5.4. Consistency, stability and solubility are the same as described in Example 1. 40 mol % of the micronutrient cations are in complex form.

EXAMPLE 16

Gelated fertilizer containing several micronutrients

A gelated fertilizer is prepared as described in Example 15 but in the present case EDTA and ammonia are first reacted with the indicated amount of water, whereupon the resulting aqueous solution of the ammonium salt of EDTA is made into a paste with the other specified constituents as described in Example 15 with heating to 45° C. and adjusting a pH of 5.4. The paste obtained practically had the same properties as the paste of Example 15.

EXAMPLE 17

Gelated fertilizer containing several micronutrients

| Constituents of formulation | nutrient content of paste |
| --- | --- |
| 24.65% b.w. of $MgSO_4 \times 7 H_2O$ | 4.0% b.w. of MgO |
| 6.08% b.w. of $MnSO_4 \times 4 H_2O$ | 1.5% b.w. of Mn |
| 7.47% b.w. of $FeSO_4 \times 7 H_2O$ | 1.5% b.w. of Fe |
| 6.60% b.w. of $ZnSO_4 \times 7 H_2O$ | 1.5% b.w. of Zn |
| 1.96% b.w. of $CuSO_4 \times 5 H_2O$ | 0.5% b.w. of Cu |
| 1.72% b.w. of $H_3BO_3$ | 0.3% b.w. of B |
| 0.02% b.w. of $(NH_4)_6Mo_7O_{24} \times 4 H_2O$ | 0.01% b.w. of Mo |
| 25.25% b.w. of EDTA | |
| 8.42% b.w. of water | |
| 12.00% b.w. of iso-$C_{13}$—alkylpolyglycol ether (8 EO) | |
| 5.83% b.w. of ammonia | 4.8% b.w. of N |

The paste is prepared under the conditions of Example 1, but the pH is adjusted to 5.2 and the mixture heated to 60° C. The paste obtained has the same consistency, stability and solubility as the paste of Example 1. 46.7 mol % of the micronutrient cations contained in the paste are in complex form.

What is claimed is:

1. A water soluble gelated micronutrient fertilizer consisting essentially of 55 to 89% by weight of a water soluble micronutrient compound of which 25 to 100 mol percent, calculated on the micronutrient cations, said micronutrient fertilizer is selected from the group consisting of Mg, Fe, Zn, Mn, Cu, Co, Ni, B and Mo, is in complexed form, 2 to 7% by weight of a macronutrient of ammonium nitrogen, 2 to 18% by weight of either, or both, of a polyglycol ether having at least 9 ethylene oxide units per molecule or a water soluble polyglycol ether derivative having at least 8 ethylene oxide units per molecule and 7 and 20% by weight of water.

2. The micronutrient fertilizer according to claim 1 wherein the micronutrient cations form chelate complex compounds with N-carboxyalkyl-amino acids.

3. A method of fertilizing plants which comprises applying an effective amount of a water soluble gelated fertilizer as claimed in claim 1 together with a suitable macronutrient.

4. A method of fertilizing plants which comprises applying an effective amount of a water soluble gelated fertilizer as claimed in claim 2 together with a suitable macronutrient.

5. The method of claim 3 or 4 wherein said water soluble fertilizer is supplied as an aqueous solution.

6. A process for fertilizing plants which comprises applying to a plant or an environment susceptible to plant growth an effective amount of an aqueous solution of a water soluble gelated micronutrient fertilizer as defined in claim 1.

7. A process for fertilizing plants which comprises applying to a plant or an environment susceptible to plant growth an effective amount of an aqueous solution of a water soluble gelated micronutrient fertilizer as defined in claim 2.

* * * * *